O. CORADI AND H. GRAF-BUCHLER.
MAGNETIC CHUCK.
APPLICATION FILED JULY 8, 1920.
1,412,776.
Patented Apr. 11, 1922.
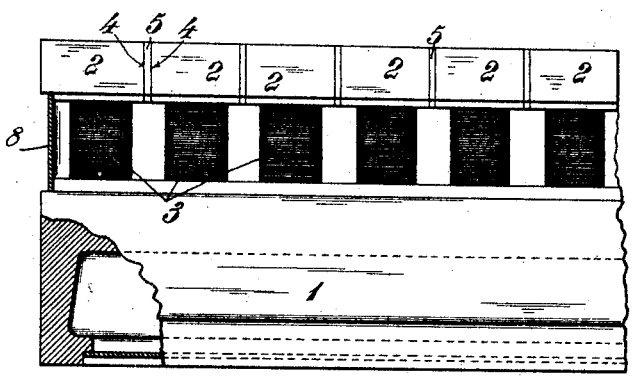
Fig.1
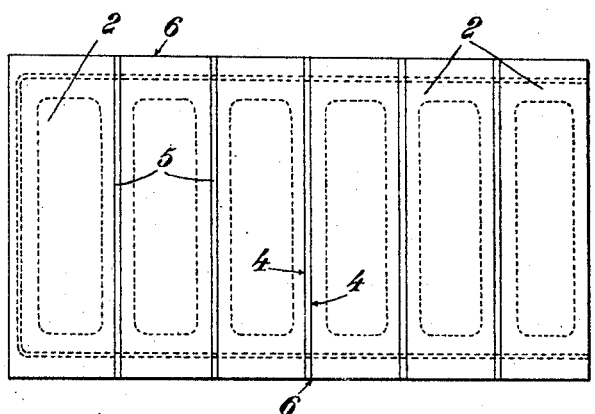
Fig.2
Fig.3
Fig.4
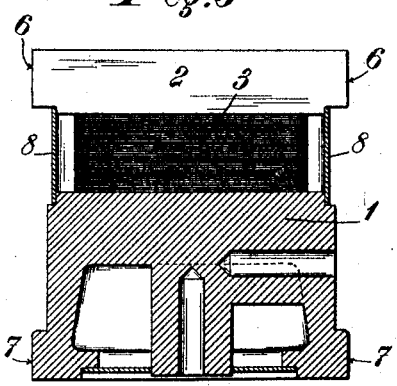
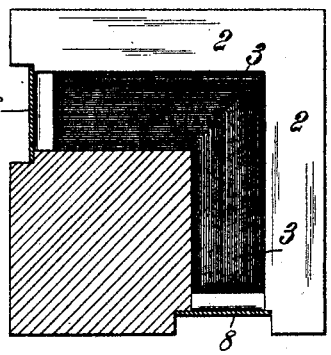
Inventors:
Oswald Coradi,
Hennig Graf-Buchler
By
Atty.

UNITED STATES PATENT OFFICE.

OSWALD CORADI AND HENRI GRAF-BUCHLER, OF ZURICH, SWITZERLAND.

MAGNETIC CHUCK.

1,412,776.  Specification of Letters Patent.  Patented Apr. 11, 1922.

Application filed July 8, 1920. Serial No. 394,819.

*To all whom it may concern:*

Be it known that we, OSWALD CORADI, a citizen of the Republic of Switzerland, residing at Zurich, Weinbergstrasse 49, Switzerland, and HENRI GRAF-BUCHLER, a citizen of the Republic of Switzerland, residing at Zurich, Splügenstrasse 12, have invented certain new and useful Improvements in Magnetic Chucks, (for which we have applied for a patent in Switzerland, application number 91, of date June 19, 1919, and in Germany, application number C28,161, of date July 2, 1919;) and we do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

The hitherto known magnetic chucks and more particularly those used in holding pieces of work such as straight edges and the like on grinding machines present the disadvantage that the parts of the chuck near its edges have no gripping power, so that the surface of a chuck cannot be utilized over its whole extent and a narrow straight edge cannot be held firmly with sufficient force. Furthermore with the known magnetic chucks a blank cannot be fixed to the lateral edge of the chuck whereby machining the blank is rendered more difficult.

The object of the present invention is a magnetic chuck in which the gaps between the poles extend entirely across the surface of the chuck from one side to the opposite side, whereby the above mentioned drawbacks are not only overcome but great advantages are attained consisting in the facts that an increased holding power can be obtained by increasing the sectional areas of the cores of the various magnets and that the magnetic action extends up to the edges of the chucks and to their lateral faces, thus enabling the machining of a blank not only on faces parallel to each other but also on faces standing at right angles to each other which is of the greatest importance when machining straight edged blanks.

Two exemplifications of the invention are shown on the accompanying drawings, on which:

Fig. 1 is an elevation and

Fig. 2 a plan view of part of a magnetic chuck in a first exemplification;

Fig. 3 is a cross-section thereof;

Fig. 4 is a section through a second exemplification.

In the Figs. 1–3 a base plate 1 is provided with a plurality of cores each fitted with a coil 3 and a pole piece 2. The gaps 4 between adjacent pole pieces 2 are filled by bars of a non magnetic material 5. The pole pieces 2 and the bars 5 are flush and form a chuck with a smooth surface.

The gaps 4 between adjacent pole pieces extend from one longitudinal edge of the chuck plate to the other, whereby the whole surface of the chuck is magnetically effective up to its edges and up to the lateral faces which are vertical to the surface of the plate. The lateral faces 6 are arranged in one common vertical plane with the lower faces 7 provided on the longitudinal edges of the base plate 1, whilst the part of the base plate lying between the faces 6 and the face 7 and the covers 8 protecting the coils 3 are back of said faces 6 and 7.

In consequence of the extension of the gaps from one longitudinal side of the chuck to the other it is rendered possible to utilize the magnetic action which is only effective when two poles are bridged over by a blank of magnetic material, up to the edges of the surface of the chuck and its lateral faces. Pieces of work can thus be machined at right angles. The chuck is almost as effective at its vertical faces as it is at its horizontal surface.

In the exemplification illustrated in Fig. 4 the pole pieces are shaped to form two surfaces of the chuck at right angles to each other. The coil is also wound at an angle of 90° and the two surfaces of the chuck standing at right angles to each other are thus energized in the same degree. Both surfaces of the chuck may be utilized for holding down pieces of work with the same effect.

The gaps that extend over the whole width of the chuck enable the ratio between the sectional areas of the cores and the surface of the chuck to be made as large as possible and it is evident that with the same degree of energizing of the core the holding power of the chuck increases proportionally to the ratio between the cross sectional areas of the cores and the surface of the chuck. A chuck according to the invention produces in consequence of the increase in the sectional areas of the cores a larger holding power without requiring more magnetising energy than the hitherto known constructions.

In order to replace one working face of the chuck shown in Fig. 4 by the other the chuck is turned by an angle of 90° by hand or any suitable device. The shape of the chuck is not limited to the rectangular cross-section but it may be any suitable one.

We claim:

1. A magnetic chuck comprising a plurality of adjacent magnets having top faces and lateral faces, respectively in planes at right angles to each other, the respective faces of each magnet being spaced apart from the faces of any other magnet.

2. In a magnetic chuck, a base plate, cores on said base plate, windings on said cores, pole pieces for said cores, said pole pieces having top faces and lateral faces, the faces of each pole piece being spaced from the faces of any other pole piece.

3. In a magnetic chuck, a base plate, cores provided upon said base plate, windings on said cores, pole pieces having lateral work-holding faces arranged side by side and spaced apart by gaps extending entirely across the chuck between opposite lateral faces, said pole pieces being flush to form horizontal and laterally gapped working faces.

4. In a magnetic chuck having a plurality of magnets each having pole pieces and operative faces at an angle to one another, windings on said magnets, the turns of the windings conforming to said angle, said pole pieces spaced apart to form gaps extending to the extreme edges of the chuck.

5. In a magnetic chuck, a base plate, cores on said base plate, pole pieces for the cores, each of said cores having faces at right angles to one another and gaps between the poles extending to said faces and entirely across the chuck to its extreme edges, said two faces adapted to replace one another by turning the chuck through an angle of ninety degrees.

6. In a magnetic chuck, cores having pole shoes in one piece with the cores, windings on said cores, a base for the cores, the pole pieces having gaps between them terminating at the outer faces of the sides of the chuck, the edges of the cores lying in the same plane as the lower portion of said base.

In testimony that we claim the foregoing as our invention, we have signed our names.

OSWALD CORADI.
HENRI GRAF-BUCHLER.